US009233324B2

(12) United States Patent
Kielbowicz et al.

(10) Patent No.: US 9,233,324 B2
(45) Date of Patent: Jan. 12, 2016

(54) INCREASED EFFICIENCY STRAINER SYSTEM

(75) Inventors: Stanislaw Kielbowicz, Waedenswil (CH); Carl W. Prather, Birmingham, AL (US)

(73) Assignee: Control Components, Inc., Rancho Santa Margarita, CA (US)

(*) Notice: Subject to any disclaimer, the term of this patent is extended or adjusted under 35 U.S.C. 154(b) by 881 days.

(21) Appl. No.: 12/578,413

(22) Filed: Oct. 13, 2009

(65) Prior Publication Data

US 2011/0084008 A1 Apr. 14, 2011

(51) Int. Cl.
*B01D 29/50* (2006.01)
*B01D 29/52* (2006.01)
(Continued)

(52) U.S. Cl.
CPC .......... *B01D 35/147* (2013.01); *B01D 35/1475* (2013.01); *B01D 35/157* (2013.01); *G21C 19/307* (2013.01)

(58) Field of Classification Search
CPC .... B01D 35/14; B01D 35/147; B01D 35/157; B01D 35/1475; B01D 29/0047; B01D 29/50; B01D 29/52; B01D 29/60; G21C 19/307
USPC ................. 210/337, 315, 137, 416.1, 321.6, 210/321.64, 321.67, 321.79, 321.8, 321.88, 210/321.89, 231, 281, 87, 90, 97, 101, 117, 210/136, 484, 232, 350, 456, 448, 452, 340, 210/341, 323.2; 136/313, 310; 376/313, 376/310
See application file for complete search history.

(56) References Cited

U.S. PATENT DOCUMENTS 3,353,680 A * 11/1967 Niebergall .................... 210/314
3,633,750 A * 1/1972 Braun et al. .................. 210/130
(Continued)

FOREIGN PATENT DOCUMENTS

| EP | 1559467 A1 * | 8/2005 |
| WO | 2008132491 A2 | 11/2008 |
| WO | WO9728537 | 11/2009 |

OTHER PUBLICATIONS

Search Report and Written Opinion for PCT/US2010/51005. Dec. 13, 2010.

*Primary Examiner* — Joseph Drodge
*Assistant Examiner* — Madeline Gonzalez
(74) *Attorney, Agent, or Firm* — Stetina Brunda Garred & Brucker

(57) ABSTRACT

In accordance with the present invention, there is provided an increased efficiency strainer system which is particularly suited for use in the emergency core cooling system of a nuclear power plant. In certain embodiments of the present invention, the strainer system includes one or more strainer cassettes or cartridges, with each such cassette or cartridge including a plurality of strainer pockets disposed in side-by-side relation to each other. In these embodiments, multiple cassettes or cartridges may be assembled together to form a strainer module of the strainer system. The strainer pockets of the cartridge each define an inflow end. Within the cartridge, or the module including multiple cartridges, the inflow ends of one or more of the strainer pockets may be enclosed by an elastic metal membrane. When in a closed position, the membrane prevents liquid flow into the corresponding strainer pocket via the inflow end thereof. The membrane remains closed when only a low pressure load is exerted thereon, but is deflected or deformed into an open position when a high pressure load is exerted thereon. The movement of the membrane to its open position effectively opens the corresponding strainer pocket, thus allowing for the flow of liquid into the interior of the strainer pocket via the inflow end thereof.

19 Claims, 6 Drawing Sheets

(51) Int. Cl.
  *B01D 29/60* (2006.01)
  *B01D 35/14* (2006.01)
  *B01D 35/157* (2006.01)
  *B01D 35/147* (2006.01)
  *G21C 19/307* (2006.01)

(56) References Cited

U.S. PATENT DOCUMENTS

| | | | |
|---|---|---|---|
| 3,952,766 A | 4/1976 | Johnson | |
| 5,453,180 A | 9/1995 | Henriksson et al. | |
| 5,539,790 A | 7/1996 | Henriksson et al. | |
| 5,688,402 A | 11/1997 | Green | |
| 5,759,399 A | 6/1998 | Bilanin et al. | |
| 7,282,142 B2 * | 10/2007 | Kraft | 210/170.03 |
| 7,822,164 B1 * | 10/2010 | Kielbowicz | 376/313 |
| 2005/0167355 A1 | 8/2005 | Kielbowicz | |
| 2005/0209563 A1 | 9/2005 | Hopping et al. | |
| 2005/0284293 A1 | 12/2005 | Rubas | |
| 2007/0084782 A1 | 4/2007 | Smith et al. | |
| 2007/0170101 A1 * | 7/2007 | Stanhope et al. | 210/130 |
| 2008/0156712 A1 | 7/2008 | Rhodes et al. | |

* cited by examiner

INCREASED EFFICIENCY STRAINER SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Technical Field of the Invention

The present invention relates generally to strainer devices and, more particularly, to a suction strainer of modular construction which is adapted to remove entrained solids or debris from the cooling liquid in a nuclear reactor, and to reduce head loss across the strainer in the presence of liquids with such entrained solids or debris.

2. Description of the Related Art

A nuclear power plant typically includes an emergency core cooling system that circulates large quantities of cooling water to critical reactor areas in the event of accidents. A boiling water reactor or BWR commonly draws water from one or more reservoirs, known as suppression pools, in the event of a loss of coolant accident. More particularly, water is pumped from the suppression pool to the reactor core and then circulated back to the suppression pool in a closed loop. A loss of coolant accident can involve the failure of reactor components that introduce large quantities of solid matter into the cooling water, which entrains the solids and carries them back to the suppression pool. For example, if a loss of coolant accident results from the rupture of a high pressure pipe, quantities of thermal insulation, concrete, paint chips and other debris can be entrained in the cooling water.

In contrast to a BWR, a pressurized water reactor or PWR, after a loss of coolant accident, typically draws cooling water from a reactor water storage tank and, after a signal, shuts off the flow from the storage tank and recirculates this water through the reactor. In this regard, the pressurized water reactor has a containment area that is dry until it is flooded by the occurrence of an accident, with the emergency core cooling system using a pump connected to a sump in the containment area to circulate the water through the reactor. Nevertheless, the water that is pumped in the event of an accident will also usually contain entrained solids that typically include insulation, paint chips, and particulates. Thus, in both types of reactors (i.e., boiling water reactors and pressurized water reactors), cooling water is drawn from a reservoir and pumped to the reactor core, with entrained solids or debris potentially impairing cooling and damaging the emergency core cooling system pumps if permitted to circulate with the water.

In recognition of the potential problems which can occur as a result of the presence of entrained solids or debris in the coolant water of the emergency core cooling system, it is known in the prior art to place strainers in the coolant flow path upstream of the pumps, usually by immersing them in the cooling water reservoir. It is critical that these strainers be able to remove unacceptably large solids without unduly retarding the flow of coolant. In this regard, the pressure (head) loss across the strainer must be kept to a minimum. Strainers are commonly mounted to pipes that are part of the emergency core cooling system and that extend into the suppression pool or sump, with the emergency core cooling system pumps drawing water through the strainers and introducing the water to the reactor core. There has been considerable effort expended in the prior art in relation to the design of strainers to decrease head loss across the strainer for the desired coolant flow. Existing strainers often include a series of stacked perforated hollow discs or flat perforated plates and a central core through which water is drawn by the emergency core cooling system pump. The perforated discs or plates prevent debris larger than a given size from passing the strainer perforations and reaching the pumps.

As is apparent from the foregoing, large amounts of fibrous material can enter the circulating coolant water in the event of a reactor accident. This fibrous material, which often originates with reactor pipe or component insulation that is damaged and enters the emergency core cooling system coolant stream in the event of a loss of coolant accidents indicated above, typically accumulates on the strainer surfaces and captures fine particulate matter in the flow. The resulting fibrous debris bed on the strainer surfaces can quickly block the flow through the strainer, even though the trapped particulates may be small enough to pass through the strainer perforations. More particularly, the debris accumulates in a fluffy density in and on the strainer until the strainer becomes completely covered with a fiber and particulate debris bed. Once this occurs, the strainer loses its complex geometric surface advantages and becomes a simple strainer. Hours to days later, some debris typically dissolves into solution and interacts with chemicals present in the containment. At the same time, containment temperatures are trending down. This phenomenon causes certain chemical precipitates to form which eventually make their way to the strainer. Once they reach the strainer surface, the pressure drop across the strainer typically dramatically increases.

The prior art has attempted to address the above-described flow blockage effect by making the strainer larger, the goal being to distribute the trapped debris over more area, reducing the velocity through the debris bed, and further reducing the head loss across the strainer as a whole. This solution, however, is often undesirable since the available space in a reactor for a suction strainer is usually limited, and further because larger strainers are typically more costly. As a result, the situation sometimes arises wherein the expected debris load after a loss of coolant accident can dictate a need for strainers that are too large for the space allotted for them in the containment area. Moreover, large strainers are often more difficult work with and thus more costly to install. In addition, prior art emergency core cooling system strainers have been constructed in ways that make them somewhat expensive to fabricate.

The present invention addresses the aforementioned needs and overcomes many of the deficiencies associated with existing nuclear power plant strainer designs providing a strainer design which is specifically suited to reduce the differential pressure experienced across the strainer in nuclear power plants with medium to high fiber loads after chemical precipitate formation. Various features and advantages of the present invention will be described in more detail below.

SUMMARY OF THE INVENTION

In accordance with the present invention, there is provided an increased efficiency strainer system which is particularly suited for use in the emergency core cooling system of a nuclear power plant. In certain embodiments of the present invention, the strainer system includes one or more strainer cassettes or cartridges, with each such cassette or cartridge including a plurality of strainer pockets disposed in side-by-side relation to each other. Multiple cassettes or cartridges may be assembled together to form a strainer module of the strainer system.

More particularly, in one embodiment of the present invention, each cartridge has a generally quadrangular configuration, as do the individual strainer pockets included therein. In this particular embodiment, the strainer pockets of the cartridge each define an inflow end, with the inflow ends of the strainer pockets of the cartridge facing in a common direction. Within the cartridge, or the module including multiple cartridges, the inflow ends of one or more of the strainer pockets may be enclosed by an elastic metal membrane. When in a closed position, the membrane prevents liquid flow into the corresponding strainer pocket via the inflow end thereof. The membrane remains closed when only a low pressure load is exerted thereon, but is deflected or deformed into an open position when a high pressure load is exerted thereon. The movement of the membrane to its open position effectively opens the corresponding strainer pocket, thus allowing for the flow of liquid into the interior of the strainer pocket via the inflow end thereof.

In accordance with another aspect of the present invention, it is contemplated that the above-described strainer cartridge(s) included in a strainer module of the strainer system may include flat, non-perforated face plates which extend from a surface of the cartridge(s) adjacent the inflow ends of the strainer pockets thereof. The non-perforated extended face plates cause the edges of a fiber and particulate debris bed forming at the inflow ends of the strainer pockets to compress and slowly curl in from an originally flush relationship to the face plates, which results in the creation of small flow paths between the face plates and debris bed as differential pressure continues to rise, thus allowing flow into the strainer and reducing head loss. As the strainer area affected by the flow receives more debris, fiber, particulate and chemical precipitate, the head loss increases until another flow path is opened into another area of the strainer. The creation of the flow paths, as caused by the optional inclusion of the extended face plates with the strainer cartridge(s), effectively reduces the maximum differential pressure experienced across the strainer and provides a way to potentially reduce required strainer surface area necessary to satisfy a particular containment recirculation net positive suction head requirement.

In accordance with another embodiment of the present invention, the strainer cassette or cartridge has a generally circular configuration, with the strainer pockets thereof being arranged in side-by-side relation to each other in a generally circular pattern. In this particular embodiment, one or more of the strainer pockets of the strainer cartridge may be outfitted with the aforementioned elastic metal membrane. Additionally, if a strainer module is constructed including multiple circularly configured strainer cartridges disposed in stacked relation to each other, it is contemplated that all of the strainer pockets of one or more of the strainer cartridges included in the module may be outfitted with an elastic metal membrane.

In accordance with another embodiment of the present invention, the strainer system comprises a plurality of cylindrically configured, tubular primary strainer elements. Each of the primary strainer elements defines an inflow end, and comprises concentrically positioned inner and outer walls which are each fabricated from a perforated metal material. The inflow end is typically defined solely by the inner wall of the primary strainer element. The inflow end of one or more of the primary strainer elements included in the strainer system may be covered by a rupture disc or segmented membrane which mirrors the functionality of the above-described elastic metal membrane. In this regard, the rupture disc or segmented membrane covering the inflow end of one or more of the primary strainer elements is operative to move from a normally closed position to an open position allowing direct liquid flow into the interior of the inner wall of the primary strainer element via the inflow end defined thereby when such rupture disc or segmented membrane is subjected to a high pressure load.

In this particular embodiment of the strainer system, it is also contemplated that one or more of the primary strainer elements may include a secondary strainer element concentrically positioned within the inner wall of the primary strainer element, thus creating a double cylinder strainer construction as opposed to the single cylinder strainer construction provided by a primary strainer element standing alone. The secondary strainer element, if included with a primary strainer element, has a construction mirroring that of the surrounding primary strainer element, with the inflow end defined by the inner wall of the secondary strainer element optionally being covered by the above-described rupture disc or segmented membrane. In the double cylinder strainer construction, no rupture disc or segmented membrane is provided on the inflow end defined by the inner wall of the primary strainer element due to the concentric positioning of the secondary strainer element therein.

The present invention is best understood by reference to the following detailed description when read in conjunction with the accompanying drawings.

BRIEF DESCRIPTION OF THE DRAWINGS

These, as well as other features of the present invention, will become more apparent upon reference to the drawings wherein.

Common reference numerals throughout the drawings and detailed description to indicate like elements.

DETAILED DESCRIPTION OF THE INVENTION

Figure 1:
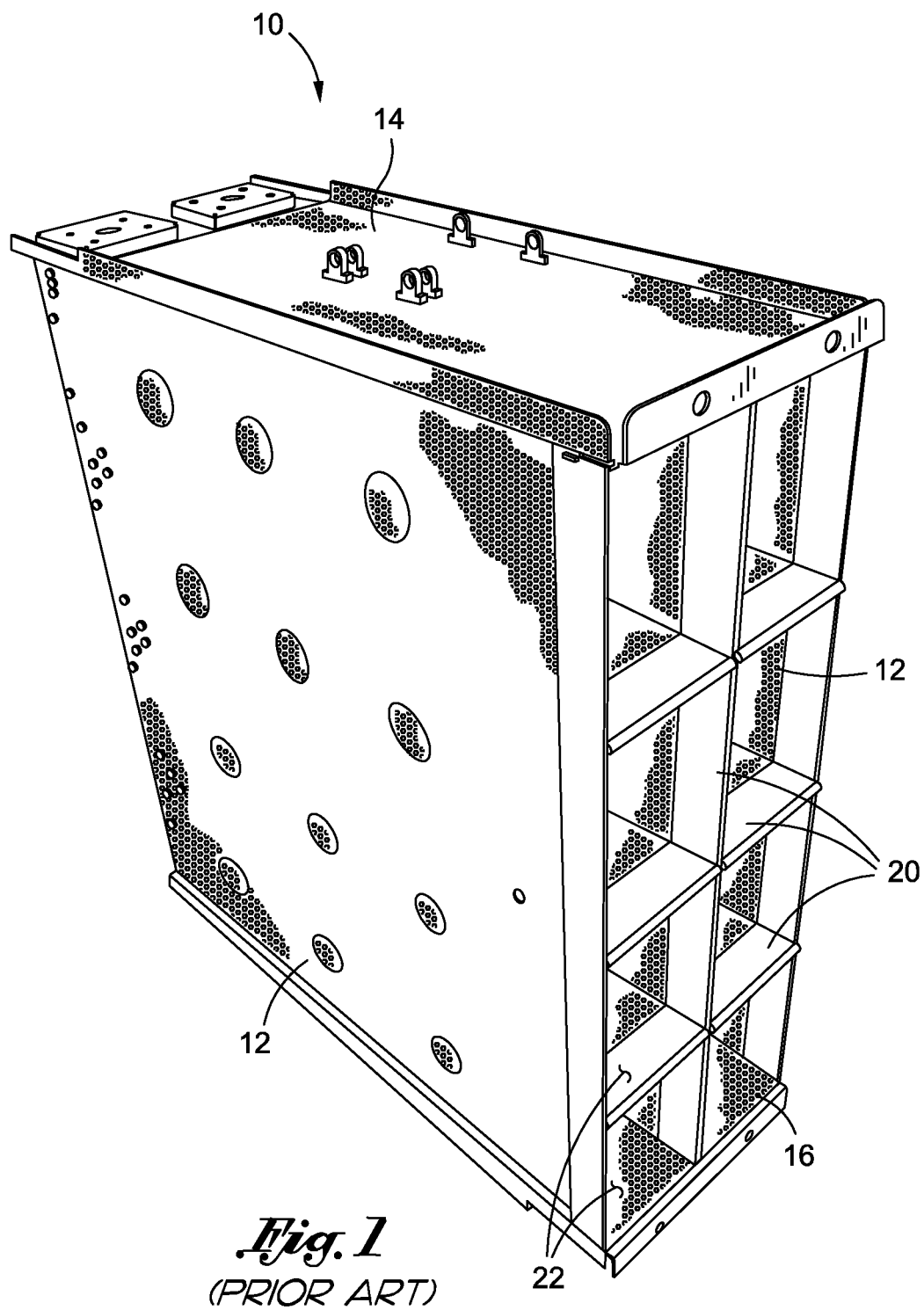
FIG. 1 is a front perspective view of a prior art strainer cassette or cartridge.
Figure 2:
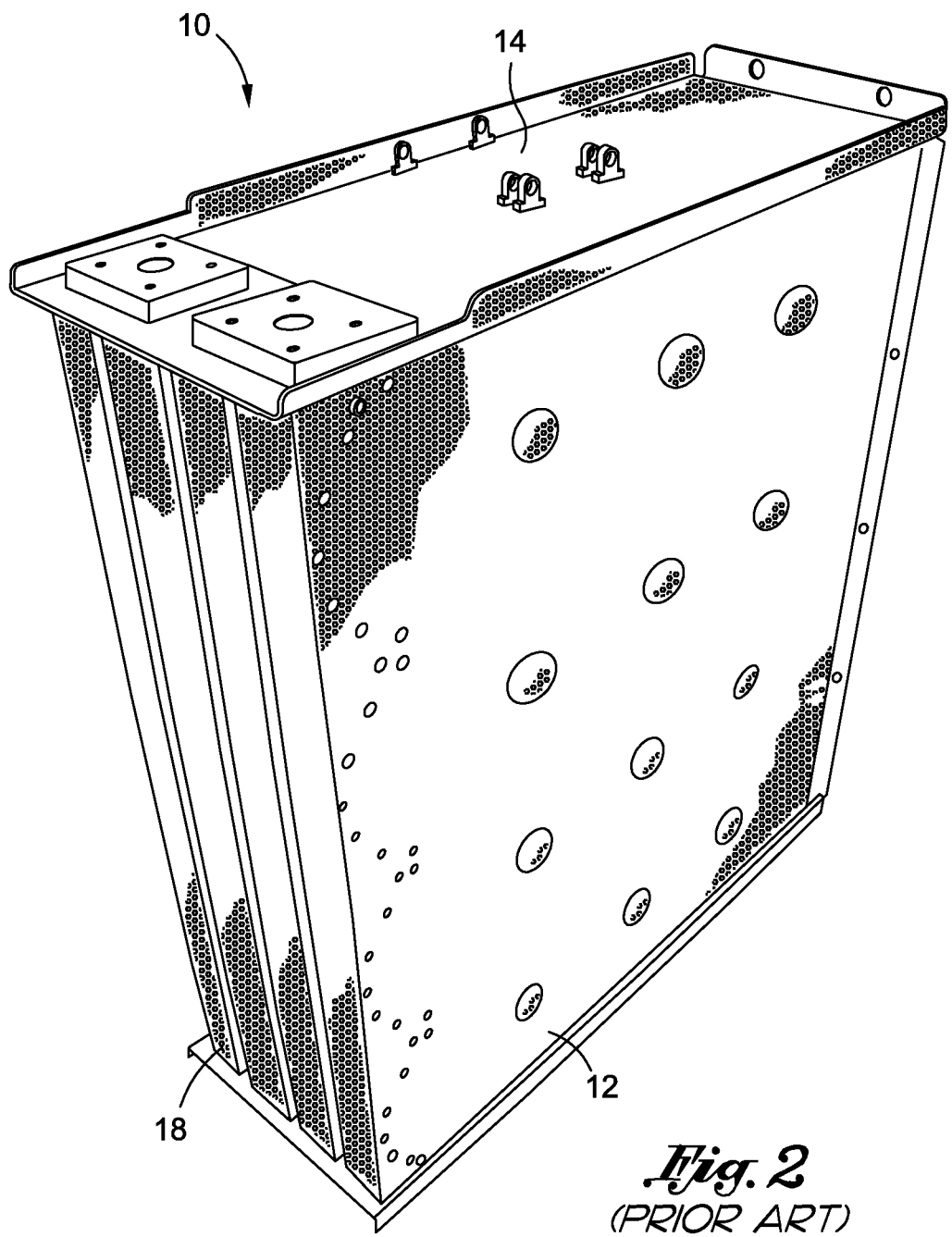
FIG. 2 is a rear perspective view of the prior art strainer cartridge shown in FIG. 1.

Referring now to the drawings wherein the showings are for purposes of illustrating preferred embodiments of the present invention only, and not for purposes of limiting the same, FIGS. 1 and 2 illustrate an existing, prior art strainer cassette or cartridge 10. The cartridge 10 has a generally quadrangular configuration. When viewed from the perspective shown in FIGS. 1 and 2, the cartridge 10 includes an opposed pair of side walls 12 extending in spaced, generally parallel relation to each other, a top wall 14 extending between the top edges of the side walls 12, a bottom wall 16 extending in spaced, generally parallel relation to the top wall 14 between the bottom edges of the side walls 12, and a back wall 18 which extends between the back edges of the side walls 12 and between the back edges of the top and bottom walls 14, 16. In the strainer cartridge 10, the side, top, bottom and back walls 12, 14, 16, 18 are each fabricated from a perforated metal material.

The strainer cartridge 10 further comprises a plurality of separator plates 20 which, when viewed from the perspective shown in FIGS. 1 and 2, are horizontally and vertically oriented between the side, top, bottom and back walls 12, 14, 16, 18 in a prescribed arrangement. More particularly, the separator plates 20 are arranged such that they, along with the side, top, bottom and back walls 12, 14, 16, 18, collectively define a plurality of strainer pockets 22 within the strainer cartridge 10. In the exemplary strainer cartridge 10 shown in FIGS. 1 and 2, a total of eight (8) strainer pockets 22 are included in the strainer cartridge 10, with the strainer pockets 22 being arranged in two side-by-side vertical columns of four (4) strainer pockets 22 each. Like the side, top, bottom and back walls 12, 14, 16, 18, each of the separator plates 20 is fabricated from a perforated metal material.

Figure 5:
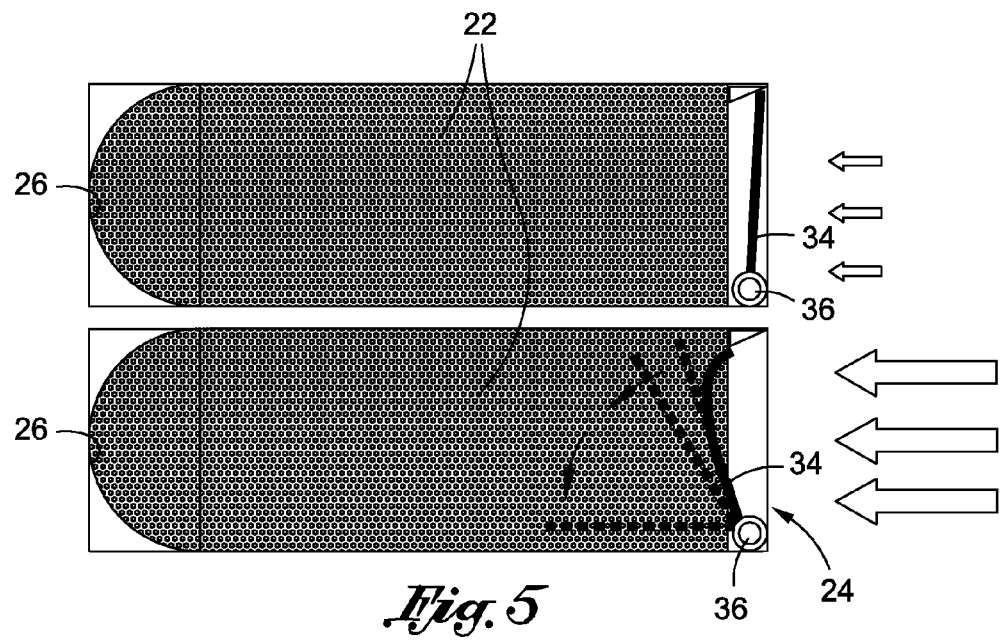
FIG. 5 is an enlargement of the encircled region 5 shown in FIG. 4.
Figure 4:
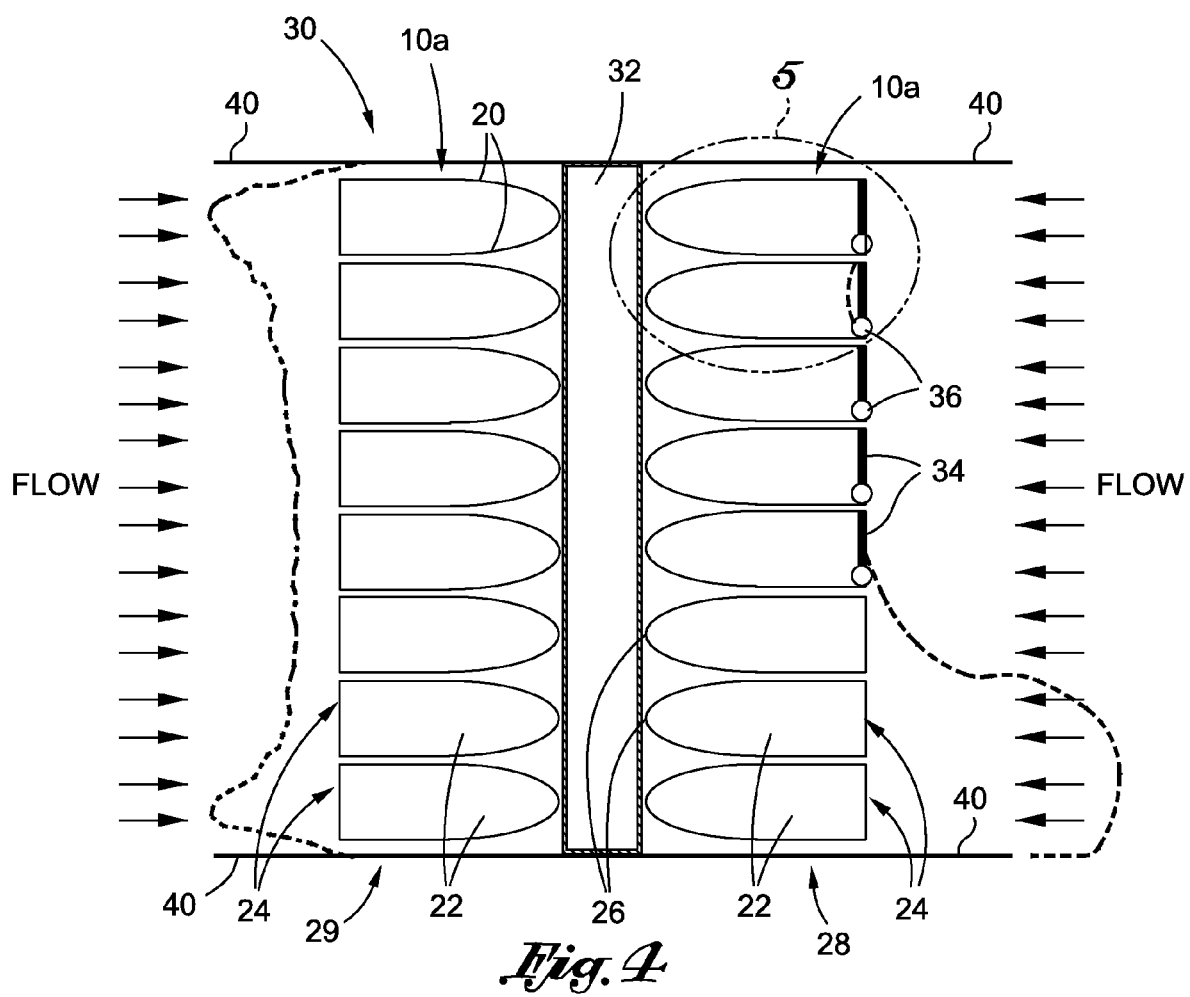
FIG. 4 is a cross-sectional view of an exemplary strainer system including an opposed pair of the strainer modules shown in FIG. 3.

As is most apparent from FIGS. 4 and 5, the horizontally oriented separator plates 20 included in the strainer cartridge 10 are preferably formed in a manner which imparts a generally parabolic configuration to each of the strainer pockets 22. In this regard, each of the strainer pockets 22 includes an open inflow end 24 at the front edges of the side, top, bottom and back walls 12, 14, 16, 18 and the front edges of the separator plates 20. In addition to the inflow end 24, each strainer pocket 22 includes an arcuate, concave back end 26 which is disposed proximate the back wall 18 of the strainer cartridge 10.

Figure 3:
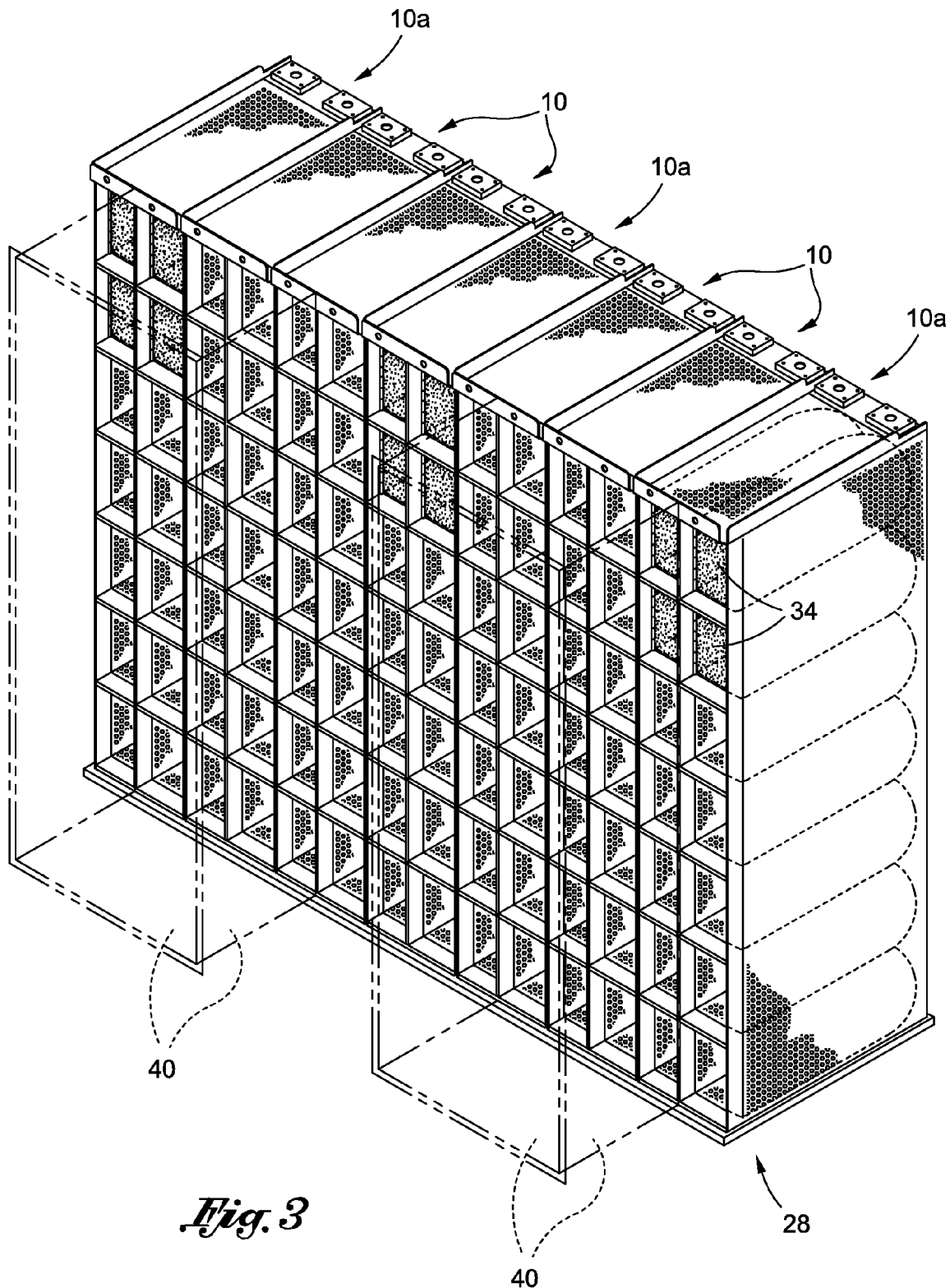
FIG. 3 is a front perspective view of a strainer module including multiple strainer cartridges constructed in accordance with a first embodiment of the present invention.

As will be discussed in more detail below, in accordance with the present invention, the strainer cartridge 10 is provided with additional structural features which enhance the functionality thereof, and hence the functionality of a strainer module assembled to include one or more enhanced strainer cartridges. FIG. 3 depicts an exemplary strainer module 28 assembled by placing multiple strainer cartridges in side-by-side relation to each other. In the exemplary strainer module 28 shown in FIG. 3, a total of seven (7) strainer cartridges are included therein, with three (3) of the strainer cartridges being "enhanced." For purposes of clarity, the "enhanced" strainer cartridges constructed in accordance with the present invention are labeled with the reference number "10*a*" in FIGS. 3 and 4 to differentiate the same from the prior art strainer cartridges 10. The remaining four (4) strainer cartridges included in the strainer module 28 are the prior art, non-enhanced strainer cartridges 10 described above. Those of ordinary skill in the art will recognize that the strainer module 28 may be assembled to include one or more enhanced strainer cartridges 10*a* and one or more standard strainer cartridges 10 in any combination, the aforementioned arrangement of three strainer cartridges 10*a* and four strainer cartridges 10 being exemplary only.

When assembled to form the strainer module 28 shown in FIG. 3, the strainer cartridges 10, 10*a* are arranged such that the inflow ends 24 defined by the strainer pockets 22 thereof face in a common direction. When the strainer module 28 is integrated into a strainer system, a suction plenum is defined between the back wall of the strainer module 28 collectively defined by the back walls 18 of the strainer cartridges 10, 10*a* thereof. The suction plenum is fluidly coupled to a pump which, when activated, creates suction in the suction plenum as results in a differential pressure condition which causes liquid to be drawn into the inflow ends 24 of the strainer pockets 22 of the strainer cartridges 10, 10*a*, and thereafter through the strainer pockets 22 of the strainer cartridges 10, 10*a* into the suction plenum. As will be recognized, flow through the strainer cartridges 10, 10*a* of the strainer module 28 is achieved as a result of the fabrication of the strainer cartridges 10, 10*a* from the perforated metal material described above.

FIG. 4 depicts an exemplary strainer system 30 which includes the strainer module 28 shown in FIG. 3 as paired with a second strainer module 29. The strainer module 29 is virtually identical to the strainer module 28, with the sole distinction being that is assembled with only the standard strainer cartridges 10 (i.e., a total of seven (7) of the cartridges 10 in side-by-side relation to each other). In the exemplary strainer system 30, the strainer modules 28, 29 are oriented in spaced, back-to-back relation to each other, with a suction plenum 32 being defined between the back walls of the strainer modules 28, 29. As will be recognized, in the exemplary strainer system 30, the activation of a pump fluidly coupled to the suction plenum 32 effectively draws liquid into the inflow ends 24 of the strainer pockets 22 of the strainer cartridges 10, 10*a* within each of the opposed strainer modules 28, 29, such liquid ultimately passing through the strainer cartridges 10, 10*a* and into the suction plenum 32. Again, the configuration of the strainer module 28 shown in FIG. 3 and the configuration of the strainer system 30 shown in FIG. 4 are intended to be exemplary only, with the present invention being directed in large measure toward the structural features added to the strainer cartridge 10 which facilitate the creation of the enhanced strainer cartridge 10*a*. These structural features or enhancements will now be described with particular regard to FIGS. 4 and 5.

Referring now to FIGS. 4 and 5, in accordance with the present invention, it is contemplated that one or more of the strainer pockets 22 of each of the strainer cartridges 10*a* included in the exemplary strainer module 28 may be outfitted with a membrane 34 which is selectively moveable between a closed position and an open position. In the exemplary strainer system 30 shown in FIG. 4, a prescribed number of the strainer pockets 22 of the strainer module 28 included in the strainer system 30 are each outfitted with a membrane 34. Each membrane 34 is preferably fabricated from an elastic metal material and is pivotally connected to a corresponding strainer pocket 32 at a joint 36. Each membrane 34 is positioned at the inflow end 24 of the corresponding strainer pocket 22, and is sized so as to substantially cover such inflow end 24. Additionally, as is seen in FIG. 5, each strainer pocket 22 outfitted with a membrane 34 further preferably includes a membrane stopper 38 mounted thereto in opposed relation to the joint 36. In this regard, that edge of the membrane 34 disposed furthest from the joint 36 is normally abutted against the corresponding membrane stopper 38 when the membrane 34 is in its closed position.

As indicated above, within one or more of the strainer cartridges 10*a* of the strainer module 28, the inflow end(s) 24 of one or more of the strainer pockets 22 may be enclosed by an elastic metal membrane 34. When in the closed position shown in FIGS. 4 and 5, the membrane 34 substantially prevents liquid flow into the corresponding strainer pocket 22 via the inflow end 24 thereof. The membrane 34 is normally maintained in its closed position by the abutment of one edge thereof against the corresponding membrane stopper 38, and remains in such closed position when only a low pressure load is exerted thereon. However, the exertion of a high pressure load on the membrane 34 effectively facilitates the deflection of deformation thereof into the open position in the manner shown by the phantom lines included in FIG. 5. As is apparent from FIG. 5, the level of flexion or deformation of the membrane 34 must be sufficient to cause the same to move beyond and thus be effectively disengaged from corresponding membrane stopper 38. Once the membrane 34 disengages the corresponding membrane stopper 38, such membrane 34 is free to rotate or pivot about the joint 36 to its fully open position. The movement of the membrane 34 to its open position effectively opens the corresponding strainer pocket 22, thus allowing for the flow of liquid into the interior of such strainer pocket 22 via the now unobstructed inflow end 24 thereof. Those strainer pockets 22 outfitted with the membranes 34 may be referred to as pressure controlled pockets or PCP's.

Within the exemplary strainer module 28 including the strainer cartridges 10*a*, it is contemplated that approximately five percent (5%) of the strainer pockets 22 included in the strainer cartridges 10*a* will each be outfitted with a membrane 34 and thus function as a PCP. As a result, approximately ninety-five percent (95%) of the strainer pockets 22 included in the strainer cartridges 10*a* of the strainer module 28 will be open without membranes 34. With regard to the distribution of those strainer pockets 22 including membranes 34, it is also contemplated that such PCP's should be kept "clean" during the phase of debris coming on the strainer module 28 in the case of an accident. Accordingly, it is desirable that the strainer pockets 22 outfitted with membranes 34 be installed or located in a dead water zone of the strainer module 28 within the overall strainer system. Typically, this dead water zone may be in the middle of the strainer module 28 and/or at the opposite location of where debris typically enters into the containment. When the strainer module 28 is in use upon the occurrence of an accident, it is contemplated that the strainer pockets 22 outfitted with the membranes 34 will not open simultaneously, but rather will open sequentially as needed to cope with chemical effects in the debris laden water circulating through the strainer module 28. The sequential opening of the PCP's, as will usually occur when the pressure load exerted thereagainst by the debris field forming on the strainer module 28 exceeds the above-described high pressure threshold, facilitates an effective, controlled reduction in head loss, and further avoids any head loss "jump" due to clogging.

As is further shown in FIGS. 3 and 4, the functional advantages to the exemplary strainer module 28 as a result of the inclusion of one or more PCP's in each of the strainer cartridges 10*a* may be further enhanced by additionally outfitting the strainer module 28 with flat, non-perforated face plates 40 which extend from prescribed surfaces of the strainer module 28 adjacent the inflow ends 24 of the strainer pockets 22 defined by the strainer cartridges 10, 10*a* thereof. More particularly, as is best seen in FIG. 3, the exemplary strainer module 28 includes a multiplicity of the extended face plates 40 which are attached to the front edges of corresponding ones of the top and bottom walls 14, 16 and separator plates 20 of the strainer cartridges 10, 10*a* included in the strainer module 28. The face plates 40 are arranged so as to define two generally quadrangular (e.g., rectangular) frames. As is seen in FIG. 3, the two quadrangular frames defined by the face plates 40 extend in spaced, generally parallel relation to each other. Since the face plates 40 are attached to the front edges of the top and bottom walls 14, 16 and separator plates 20, the frames defined thereby effectively circumvent the inflow ends 24 of a prescribed number of the strainer pockets 22, one or more of which may be outfitted with a membrane 34 so as to function as an above-described PCP. Those of ordinary skill in the art will recognize that the particular arrangement of the face plates 40 as shown in FIG. 3 is exemplary only, and that the number, size and arrangement of the face plates 40 may be selectively varied as needed to provide the functionality enhancements described below based on the particular environment or configuration of the strainer system in which the strainer module 28 outfitted with the face plates 40 is to be integrated.

As indicated above, the face plates 40 extend forwardly from the strainer module 28 such that the two quadrangular frames defined by the face plates 40 effectively circumvent the inflow ends 24 of a prescribed number of the strainer pockets 22. As shown in FIG. 4, in the exemplary strainer system 30, though the strainer module 29 is not assembled to include the enhanced strainer cartridges 10*a*, such strainer module 29 is still outfitted with the above-described face plates 40 which are arranged on the strainer module 29 in the same pattern described above in relation to the strainer module 28. In this regard, the functional advantages attributable to the inclusion of the face plates 40 on the strainer module 28 are equally applicable to the strainer module 29, despite the absence therein of any of the PCP's. When included with the strainer module 29, the face plates 40 protrude forwardly from the strainer module 29 such that the spaced, generally parallel pair of quadrangular frames defined thereby circumvent the inflow ends 24 of a prescribed number of the strainer pockets 22 of the strainer module 29.

As is further apparent from FIG. 4, the face plates 40 included with the strainer modules 28, 29 cause the edges of a fiber and particulate debris bed 42 which may form at the inflow ends of the strainer pockets 22 to compress and slowly curl in from an originally flush relationship to the inner surfaces of the face plates 40. This curling in of the debris bed 42 results in the creation of small flow paths between the inner surfaces of the face plates 40 and the debris bed 42 as differential pressure continues to rise, thus promoting liquid flow through the strainer modules 28, 29 and reducing head loss. The creation of these flow paths, as caused by the inclusion of the face plates 40 with the strainer modules 28, 29, effectively reduces the maximum differential pressure experienced across the strainer modules 28, 29. Those of ordinary skill in the art will recognize that the face plates 40 may be included on one, both or neither of the face plates 40. In this regard, the inclusion of the face plates 40 with one or both of the strainer modules 28, 29 is purely optional.

Figure 6:
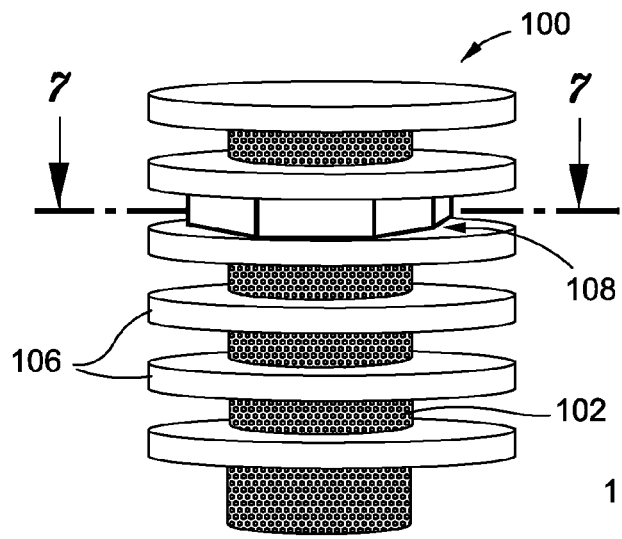
FIG. 6 is a perspective view of a strainer module constructed in accordance with a second embodiment of the present invention.
Figure 7:
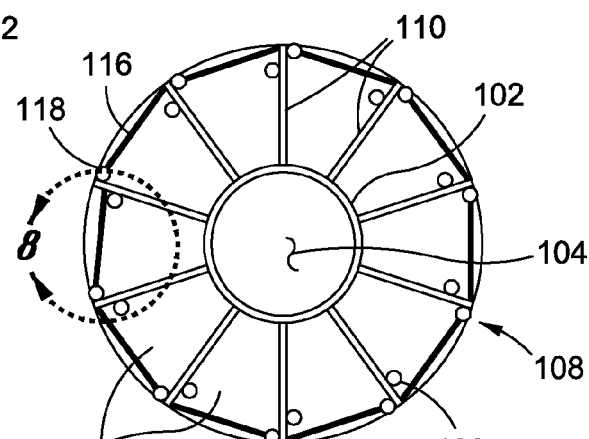
FIG. 7 is a cross-sectional view taken along line 7-7 of FIG. 6.
Figure 8:
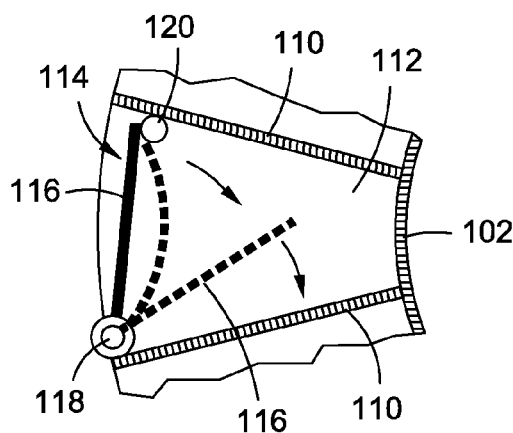
FIG. 8 is an enlargement of encircled region 8 shown in FIG. 7.

Referring now to FIGS. 6-8, there is shown a strainer module 100 constructed in accordance with a second embodiment of the present invention. The strainer module 100 comprises a generally cylindrical, tubular main body section 102 which defines a section plenum 104 extending axially therethrough. Extending radially from the outer surface of the main body section 102 in spaced, generally parallel relation to each other are a plurality of circularly configured separator plates 106. Though not shown in FIG. 6, the main body section 102 includes openings formed therein which allow liquid flowing between the separator plates 106 to be drawn into the suction plenum 104 via such openings upon the creation of a pressure differential condition attributable to the activation of a pump fluidly coupled to the suction plenum 104.

The strainer module 100 further comprises at least one circularly configured strainer cartridge 108 which is positioned between a prescribed adjacent pair of the separator plates 106. The strainer cartridge 108 comprises a multiplicity of wall members 110 which are arranged and attached to each other so as to collectively define a plurality of strainer pockets 112 of the strainer cartridge 108. In the strainer cartridge 108 shown in FIGS. 6 and 7, a total of ten (10) strainer pockets 112 are included in the strainer cartridge 108, with the strainer pockets 112 being arranged in a circularly configured array. The wall members 110 of the strainer cartridge 108 are each preferably fabricated from a perforated metal material.

In the strainer cartridge 108 included in the strainer module 100, each of the strainer pockets 112 includes an open inflow end 114 which is defined by the peripheral edges of corresponding wall members 110. Thus, as seen in FIGS. 6 and 7, the inflow ends 114 of the strainer pockets 112 are directed or face radially outwardly relative to the suction plenum 104 defined by the main body section 102. In the strainer cartridge 108, each of the strainer pockets 112 is preferably outfitted with a membrane 116 which mimics the functionality of the above-described membrane 34. In this regard, each membrane 116 is preferably fabricated from an elastic metal material and is pivotally connected to a corresponding strainer pocket 112 at a joint 118. Each membrane 116 is positioned at the inflow end 114 of the corresponding strainer pocket 112, and is sized so as to substantially cover such inflow end 114. As is best seen in FIG. 7, each strainer pocket 112 is further outfitted with a membrane stopper 120 which is mounted thereto in opposed relation to the joint 118. In this regard, that edge of the membrane 116 disposed furthest from the joint 118 is normally abutted against the corresponding membrane stopper 120 when the membrane 116 is in its closed position.

In the strainer cartridge 108, each membrane 116, when in its closed position, substantially prevents liquid flow into the corresponding strainer pocket 112 via the inflow end 114 thereof. Each membrane 116 is normally maintained in its closed position by the abutment of one edge thereof against the corresponding membrane stopper 120, and remains in such closed position when only a low pressure load is exerted thereon. However, the exertion of a high pressure load on the membrane 116 effectively facilitates the flexion or deformation thereof into the open position in the manner shown by the phantom lines included in FIG. 8. As is apparent from FIG. 8, the level of flexion or deformation of the membrane 116 must be sufficient to cause the same to move beyond and thus be effectively disengaged from the corresponding membrane stopper 120. Once the membrane 116 disengages the corresponding membrane stopper 120, such membrane 116 is free to rotate or pivot about the joint 118 to its fully open position. The movement of the membrane 116 to its open position effectively opens the corresponding strainer pocket 112, thus allowing for the flow of liquid into the interior of such strainer pocket 112 via the now unobstructed inflow end 114 thereof.

Though, in FIG. 7, each of the strainer pockets 112 included in the strainer cartridge 108 is shown as being outfitted with a membrane 116, those of ordinary skill in the art will recognize that any number of the strainer pockets 112 less than the entire number thereof may be outfitted with a membrane 116 in any distribution or arrangement. Further, the strainer cartridge 108 may be assembled to include greater or fewer than ten strainer pockets 112 without departing from the spirit and scope of the present invention. Additionally, though the strainer module 100 is shown as including only one strainer cartridge 108 between one adjacent pair of the separator plates 106, those of ordinary skill in the art will also recognize that one or more additional strainer cartridges 108 may be included in the strainer module 100 between one or more other adjacent pairs of the separator plates 106. Within the strainer cartridge 108, it is contemplated that the strainer pockets 112 outfitted with the membranes 116 will not open simultaneously, but rather will open sequentially as needed to cope with chemical effects in debris laden water circulating through the strainer module 100. The sequential opening of the membranes 116 will usually occur when the pressure load exerted thereagainst by the debris field forming on the strainer module 100 exceeds a prescribed high pressure threshold as described above in relation to the strainer module 28.

Figure 9:
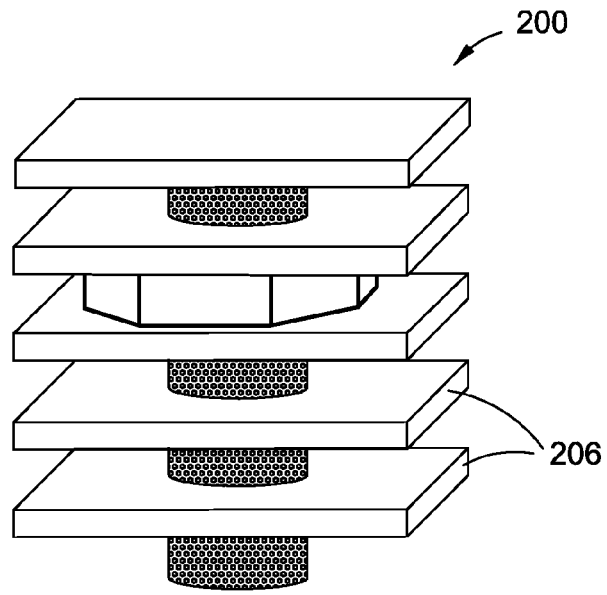
FIG. 9 is a perspective view of a strainer module constructed in accordance with a third embodiment of the present invention.

Referring now to FIG. 9, there is shown a strainer module 200 constructed in accordance with a third embodiment of the present invention. The sole distinction between the strainer modules 100, 200 lies in the separator plates 206 included in the strainer module 200 each having a generally quadrangular (e.g. square) configuration, as opposed to the circular configuration of the above-described separator plates 106 included in the strainer module 100.

Figure 10:
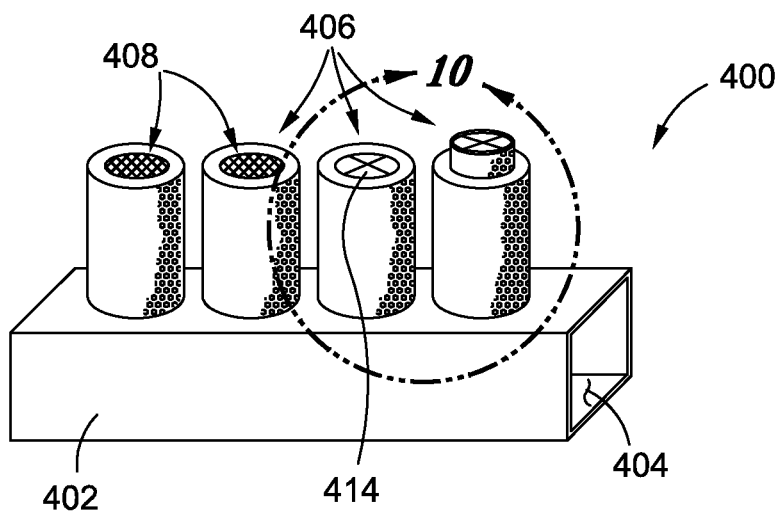
FIG. 10 is a perspective view of a strainer module constructed in accordance with a fourth embodiment of the present invention.
Figure 11:
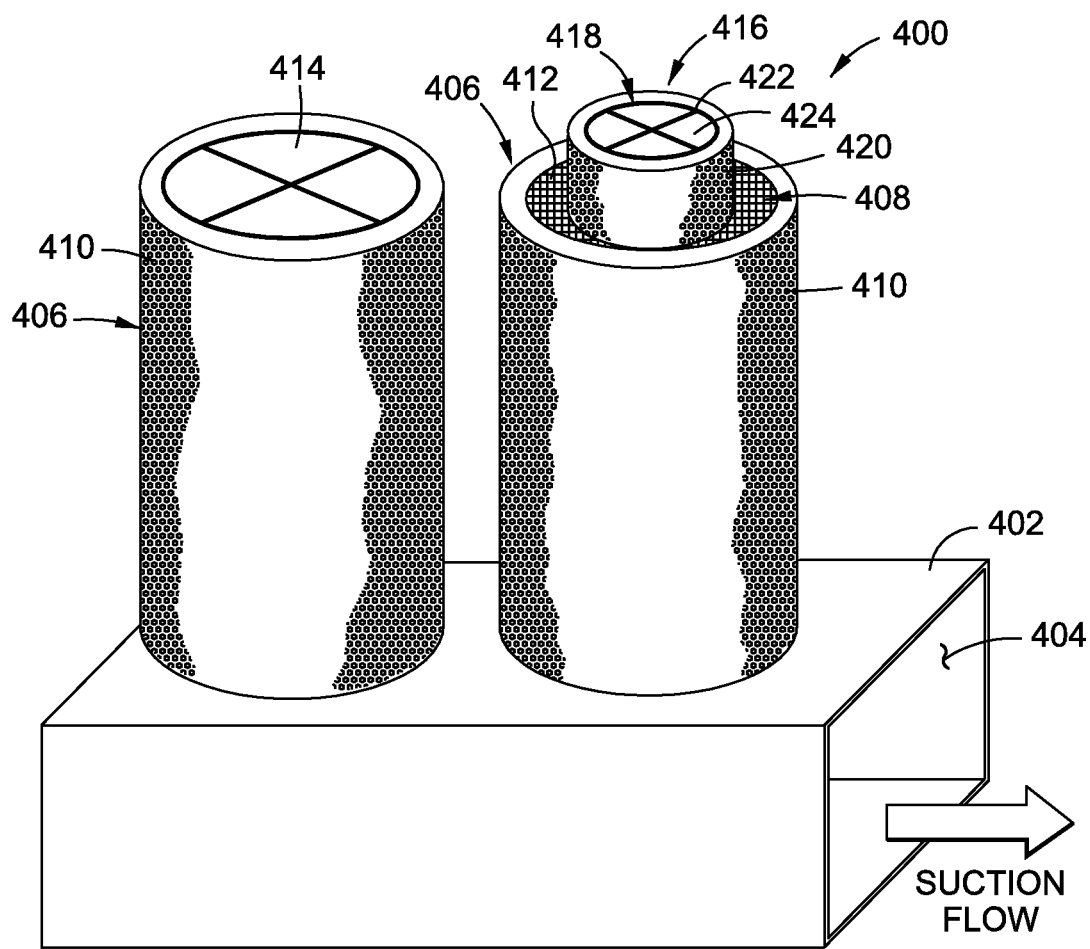
FIG. 11 is an enlargement of the encircled region 11 shown in FIG. 10.

Referring now to FIGS. 10 and 11, there is shown a strainer module 300 constructed in accordance with a fourth embodiment of the present invention. The strainer module 400 comprises a main body section 402 which has a generally quadrangular cross-sectional configuration and defines a suction plenum 404. Attached to a common wall of the main body section 402 and protruding therefrom in spaced, generally parallel relation to each other are a plurality of (e.g., four) cylindrically configured, tubular primary strainer elements 406 which each fluidly communicate with the suction plenum 404. Each of the primary strainer elements 406 defines an inflow end 408, and comprises concentrically positioned outer and inner walls 410, 412. The outer and inner walls 410, 412 are each fabricated from a perforated metal, mesh-like material. The inflow end 408 is typically defined solely by the inner wall 412 of the primary strainer element 406.

In the exemplary strainer module 400, the inflow end 408 of one of the primary strainer elements 406 is covered by a rupture disk or segmented membrane 414 which mirrors the functionality of the above-described membranes 34, 116. In this regard, the segmented membrane 414 is operative to move from a normally closed position (as shown in FIGS. 10 and 11) to an open position allowing direct liquid flow into the interior of the inner wall 412 of the corresponding primary strainer element 406 via the inflow end 408 defined thereby when such segmented membrane 414 is subjected to a high pressure load beyond a prescribed threshold. The segmented membrane 414 has a generally circular configuration and defines four (4) membrane quadrants which are individually movable relative to each other.

In the strainer module 400 shown in FIGS. 10 and 11, it is also contemplated that one or more of the primary strainer elements 406 may include a secondary strainer element 416 concentrically positioned within the inner wall 412 of the primary strainer element 406, thus creating a double cylinder strainer construction as opposed to the single cylinder strainer construction provided by any primary strainer element 406 standing alone. The secondary strainer elements 416 defines an inflow end 418, and comprises concentrically positioned outer and inner walls 420, 422. The outer and inner walls 420, 422 are each fabricated from a perforated metal, mesh-like material. The inflow end 418 is typically defined solely by the inner wall 420 of the secondary strainer element 416.

In the secondary strainer module 416, the inflow end 418 is covered by a rupture disk or segmented membrane 424 which mirrors the functionality of the above-described segmented membrane 414. In this regard, the segmented membrane 424 is operative to move from a normally closed position (as shown in FIGS. 10 and 11) to an open position allowing direct liquid flow into the interior of the inner wall 422 of the secondary strainer element 416 via the inflow end 418 defined thereby when such segmented membrane 424 is subjected to a high pressure load beyond a prescribed threshold. The segmented membrane 424 also has a generally circular configuration and defines four (4) membrane quadrants which are individually movable relative to each other.

When the exemplary strainer module 400 is integrated into a strainer system, the creation of a pressure differential condition attributable to the activation of a pump fluidly coupled to the suction plenum 404 causes liquid to be drawn through the primary strainer elements 406 and the sole secondary strainer element 416 into the suction plenum 404. Within the strainer module 400, it is contemplated that the segmented membranes 414, 424 will not open simultaneously, but rather will open sequentially as needed to cope with chemical effects in debris laden water circulating through the strainer module 400. As described above in relation to the strainer module 28, the sequential opening of the segmented membranes 414, 424 will usually occur when the pressure load exerted thereagainst by a debris field forming of the strainer module 400 exceeds a prescribed high pressure threshold.

Those of ordinary skill in the art will recognize that greater or fewer than four primary strainer elements 406 may be included in the strainer module 400 without departing from the spirit and scope of the present invention. Along these lines, more than one primary strainer element 406 may be outfitted with a segmented membrane 414, or with the above-described secondary strainer element 416 including its own segmented membrane 424. Further, no primary strainer module 406 need necessarily be outfitted with a secondary strainer element 416.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A strainer module, comprising:
   at least one strainer cartridge defining a plurality of pressure activated strainer pockets and a plurality of open strainer pockets separate from the plurality of pressure activated strainer pockets, the plurality of pressure activated strainer pockets and each of the open strainer pockets defining an open inflow end; and
   a plurality of deformable membranes attached to the at least one strainer cartridge in a closed position substantially covering the inflow ends of respective ones of the plurality of pressure activated strainer pockets;
   each deformable membrane being deformably transitionable from the closed position to substantially prevent fluid flow into the pressure activated strainer pocket through the inflow end thereof, to an open position wherein the inflow end of the corresponding pressure activated strainer pocket is at least partially unobstructed allowing for fluid flow into the inflow end of the pressure activated strainer pocket and through a strainer surface at least partially defining the pressure activated strainer pocket;
   each deformable membrane being fabricated from an elastic material adapted to flex upon the application of a prescribed pressure load thereto, and the movement of the membrane from the closed position to the open position is facilitated by the flexion thereof.

2. The strainer module of claim 1 wherein the membrane is fabricated from a non-perforated elastic metal material.

3. The strainer module of claim 1 further comprising:
   at least one membrane stopper attached to the at least one strainer cartridge adjacent the inflow end of the respective pressure activated strainer pocket substantially covered by the membrane;
   the membrane stopper being sized and configured to normally maintain the membrane in the closed position, and to permit the membrane to flex to the open position upon the application of the prescribed pressure load thereto.

4. The strainer module of claim 3 wherein the membrane is pivotally connected to the at least one strainer cartridge at a joint which is disposed adjacent the inflow end of the respective pressure activated strainer pocket in opposed relation to the membrane stopper.

5. The strainer module of claim 1 wherein the plurality of membranes are arranged on the strainer cartridge in a prescribed pattern.

6. The strainer module of claim 1 wherein the pressure activated strainer pockets and the plurality of open strainer pockets are arranged in at least two side-by-side columns which extend in generally parallel relation to each other such that the inflow ends of the strainer pockets face in a common direction.

7. The strainer module of claim 1 further comprising a plurality of face plates attached to the at least one strainer cartridge in a manner wherein the faceplates collectively define a frame which extends forwardly relative to and at least partially circumvents the inflow ends of at least some of the strainer pockets.

8. A strainer module, comprising:
   at least one strainer cartridge defining a plurality of pressure activated strainer pockets and a plurality of open strainer pockets separate from the plurality of pressure activated strainer pockets, the plurality of pressure activated strainer pockets and each of the open strainer pockets defining an open inflow end; and
   a plurality of deformable membranes attached to the at least one strainer cartridge in a closed position substantially covering the inflow ends of respective ones of the plurality of pressure activated strainer pockets;
   each of the deformable membranes being individually and deformably transitionable from the closed position to substantially prevent fluid flow into the pressure activated strainer pocket through the inflow end thereof, and an open position wherein the inflow end of the corresponding pressure activated strainer pocket is at least partially unobstructed allowing for fluid flow into the inflow end of the pressure activated strainer pocket and through a strainer surface at least partially defining the pressure activated strainer pocket.

9. The strainer module of claim 8 wherein each of the membranes is fabricated from an elastic, non-perforated metal material adapted to flex upon the application of a prescribed pressure load thereto, and the movement of each of the membranes from the closed position to the open position is facilitated by the flexion thereof.

10. The strainer module of claim 8 wherein the pressure activated strainer pockets comprise approximately five percent of the combined totality of the pressure activated strainer pockets and open strainer pockets included in the at least one strainer cartridge.

11. The strainer module of claim 8 further comprising:
    a plurality of membrane stoppers attached to the at least one strainer cartridge adjacent the inflow ends of respective ones of the strainer pockets which are substantially covered by respective ones of the membranes;

each of the membrane stoppers being sized and configured to normally maintain a respective one of the membranes in the closed position, and to permit a respective one of the membranes to flex to the open position upon the application of the prescribed pressure load thereto.

12. The strainer module of claim 11 wherein each of the membranes is pivotally connected to the at least one strainer cartridge at a joint which is disposed adjacent the inflow end of a respective one of the strainer pockets in opposed relation to a respective one of the membrane stoppers.

13. The strainer module of claim 8 wherein the strainer pockets are arranged in a plurality of side-by-side columns which extend in generally parallel relation to each other such that the inflow ends of the strainer pockets face in a common direction.

14. The strainer module of claim 8 further comprising a plurality of face plates attached to the at least one strainer cartridge in a manner wherein the faceplates collectively define a frame which extends forwardly relative to and at least partially circumvents the inflow ends of at least some of the strainer pockets.

15. A strainer cartridge, comprising:
- a plurality of pressure activated strainer elements and an open strainer element, each of which includes an inflow end; and
- a plurality of deformable membranes attached to respective ones of the pressure activated strainer elements in a closed position covering the inflow end thereof, the deformable membrane being positioned such that flow into the inflow end of the open strainer element is unobstructed by the deformable membrane;
- each deformable membrane being selectively and deformably transitionable from the closed position to substantially prevent fluid flow into the corresponding pressure activated strainer element through the inflow end thereof, and an open position wherein the inflow end is at least partially unobstructed allowing for fluid flow into the corresponding pressure activated strainer element through the inflow end thereof.

16. The strainer cartridge of claim 15 wherein:
- each of the pressure activated strainer elements has a cylindrically configured, tubular configuration; and
- each membrane has a generally circular, segmented configuration defining four membrane quadrants which are individually moveable relative to each other.

17. A strainer module, comprising:
- at least one strainer cartridge defining a plurality of fluid inflow portions including a plurality of pressure activated inflow portions and an open inflow portion;
- a plurality of membranes attached to the at least one strainer cartridge in a closed position, wherein each membrane covers a respective one of the plurality of fluid inflow portions;
- the strainer cartridge being configured such that each pressure activated inflow portion is transitionable relative to the open inflow portion from a closed state wherein the corresponding membrane is in the closed position thereby substantially preventing fluid flow into the pressure activated inflow portion, to an open state wherein the pressure activated inflow portion is at least partially unobstructed to allow for the flow of a fluid therein and through a strainer surface at least partially defining the pressure activated inflow portion.

18. The strainer cartridge of claim 15 wherein the strainer cartridge comprises a plurality of strainer elements which are arranged in a generally circular array such that the inflow ends thereof are directed radially outward relative to a common axis.

19. The strainer cartridge of claim 18 wherein a plurality of membranes is attached to the strainer cartridge in a manner substantially covering the inflow ends of respective ones of the strainer elements.

* * * * *